United States Patent Office 3,790,653
Patented Feb. 5, 1974

3,790,653
POLYESTER FILM BASE HAVING UNIFORM
HIGH OPTICAL DENSITY
Kenneth T. Barkey, Gerald C. Gandy, and Douglas C. May, Rochester, N.Y., assignors to Eastman Kodak Company, Rochester, N.Y.
No Drawing. Filed Dec. 29, 1971, Ser. No. 213,808
Int. Cl. B29d 7/24; C08g 39/10, 51/08
U.S. Cl. 264—171
5 Claims

ABSTRACT OF THE DISCLOSURE

Biaxially-oriented polyester film base having uniform high optical density and free of pinholes or other opacity defects is produced by forming a dispersion of carbon black and polyvinylpyrrolidone (PVP) in ethylene glycol in a high shear mill, adding the dispersion along with polyester forming reactants to an ester exchange reactor, and carrying out the production of the polyester monomer and its subsequent conversion to polyester prepolymer and polyester in the presence of the dispersed carbon and PVP.

FIELD OF THE INVENTION

This invention relates to a process for uniformly dispersing carbon black particles in a liquid vehicle to form a stable dispersion and to manufacture of biaxially-oriented, opaque polyester film base comprising said carbon black.

DESCRIPTION OF THE PRIOR ART

Many methods for producing opaque poly(ethylene terephthalate) foils, fibers, filaments, ribbons and other shaped bodies by means of dispersions of pigments, such as carbon black, and the like, are known in the prior art. U.S. Pat. 3,007,891, for example, teaches finely dispersed pigment-glycol dispersions prepared by using specific condensation products as dispersing agents in order to enhance the admixing of the dispersions into the reaction mixture used in the manufacture of foils of polyesters containing the pigment. British Pat. 1,202,636 teaches using high shear forces in forming pigment formulations from carbon black, diglycol terephthalate and a surfactant, and subsequently using the formulations to mass color a thermoplastic material, e.g. a polyester, which can be made into uniformly colored filaments or threads. Also, U.S. Pat. 3,002,942 teaches a formulation consisting of carbon black dispersed in ethylene glycol in the presence of an ionic dispersing agent which may be added to the reaction mass of a polyester forming process before or during the ester exchange or polycondensation process to manufacture a pigmented polyester which is useful for the manufacture of threads, fibers, and other shaped articles. Preparation of carbon black dispersions in ethylene glycol by ball milling for use in preparing a polyester and a film support of improved total diffuse density from the pigmented polyester is taught by U.S. Pat. 3,340,062. Also, U.S. Pat. 2,882,255 teaches modified linear polyesters containing from 5 to 40% by weight of a polymer derived in whole or in part from N-vinylpyrrolidone. The modified resins are used to make cast films and spun fibers having improved receptivity to cellulose acetate type dyes and to acid wool dyes.

SUMMARY OF THE INVENTION

When finely-divided carbon black is milled in a dispersing mill under high shear conditions in a minimum amount of ethylene glycol vehicle, the highly concentrated dispersion has a tendency to form a gel in the mill, making further uniform dispersing of the carbon particles difficult. It has now been found that by carrying out the high-shear milling of carbon black, preferably a furnace carbon black, in ethylene glycol in the presence of dissolved polyvinylpyrrolidone, (PVP), as a dispersing agent amounting to from about 2 to 8 percent by weight of the carbon black-PVP-ethylene glycol charge to the mill, a carbon black dispersion in ethylene glycol is obtained which does not gel. The dispersion has advantageous properties for use as an opacifier means for the manufacture of opaque, biaxially-oriented film, particularly useful as a support in a multi-layered photographic film. The dispersion of the present invention, in a preferred form, consists essentially from about 15 to 20 parts of carbon black, from about 4 to 5 parts of polyvinylpyrrolidone (PVP) having a molecular weight of from about 10,000 to 30,000, and from about 76 to 80 parts of ethylene glycol, all parts being by weight.

The dispersing of a finely-divided pigment, such as carbon black, into a liquid vehicle, such as ethylene glycol, is a mechanical operation which in itself, to a certain degree, is readily accomplished with available commercial mills. Formation of stable dispersions of the dispersed carbon black in ethylene glycol vehicle is aided, however, by the use of dispersing agents, such as surfactants, which serve to enhance wetting of the individual carbon particles by the liquid and to prevent the dispersed particles from agglomerating after the dispersing mill is turned off and the dispersion is allowed to stand. Use of surfactant-containing carbon black dispersions in the manufacture of opaque polyesters, such as poly(ethylene terephthalate), which are to be used to produce opaque fibers or filaments is generally successful because of the final form of such products. However, when dispersions are to be used to opacify sheets, foils or films which are extremely thin and which must be biaxially-oriented, the need for a highly uniform dispersion of the opacifier in the polyester becomes more critical. Inadequate dispersion of the opacifier in a polyester intended for use as a film support often causes production of waste film support because of non-uniformity in dispersions or agglomerations of particles which cause formation of areas of differing opacity in the support. Such areas often result from events which may have occurred sometime during the manufacture of the polyester in the presence of the dispersion, or in its subsequent extrusion into a film shaped body, or during its tentering or drawing into a biaxially-oriented film intended for use as an opaque photographic film support. A problem which is encountered particularly in manufacture of an opaque photographic film support with a surfactants-containing dispersion, is that the dispersant also may in some way interfere with the photographic chemistry of the film in which the opaque support is used. Therefore, when the polyester is to be used to manufacture a film support the dispersant must be a material which not only does not interfere with the catalysis of the polyester formation reactions, but also must be one which does not cause the formation of chemical products which may interfere with the substratum or other layers applied to the film support in its ultimate use in a multi-layered photographic film.

The dispersion of the present invention avoids the above problems and has other advantages. The dispersion has for one advantage the property of not setting into a gel in the mill, thereby permitting greater dispersibility of the individual particles of carbon black in the ethylene glycol in larger amounts than previously obtained in absence of the PVP dispersing agent. A second advantage of the present dispersion is that when diluted with additional ethylene glycol, the dispersion can be centrifuged, if necessary, in a high speed, for example, a Sharples, continuous centrifuge to remove any oversize carbon particles, which have not been dispersed by the high shear mill, while preserving the homogeneity of the dispersion. When dispersed in the ester exchange reactants, the dispersion of the invention has been found not to interfere with the polyester formation. The opaque polyester product made in the presence of the dispersion has been found particularly suitable for the manufacture of film support for a multilayered photographic film. Opaque film can be made according to the present invention to have a specular optical density over the wavelength range of 350 to 750 nanometers which is in excess of 12, as compared to a standard optical density of less than about 0.05 for unpigmented photographic film.

In practicing the invention, a diluted, preferably centrifuged, dispersion is made and then is blended in a mixer with other polyester forming reactant materials, i.e. dimethyl terephthalate, at a temperature above the melting point of the latter reactant material and is charged with catalysts to an ester exchange reactor wherein the ester exchange reaction is carried out in a known way to form monomer and then prepolymer. The prepolymer is then cast, ground and polymerized further in a known way by fluidized bed techniques to form an apoque form of poly(ethylene terephthalate) having an inherent viscosity of about 0.63. The latter polyester is melt filtered and extruded, biaxially-oriented by drafting and tentering, and is then heat set in sheet form of a thickness desired for manufacture of the polyester sheet into an opaque film which then is used as an opaque support for a multilayered photographic film. The opaque biaxiallly-oriented film support is found to be free of pinholes and of non-opaque areas, which would be found present upon viewing against a lighted background if there were any non-homogeneity of dispersion of the carbon black in the polyester. Pinholes of light, or light-passing, non-opaque, areas occur when agglomerates of particles of a pigment break apart during the drafting and tentering of the pigmented film and leave tears or areas of transparency in the thinly-drawn sheet.

DESCRIPTION OF THE PREFERRED EMBODIMENTS

Example 1

Preparation of dispersion.—A furnace carbon black-polyvinylpyrrolidone-ethylene glycol dispersion of the invention was prepared as follows:

A suitably-sized high shear mill (Kady) was used as the dispersing mill. Into the mill were placed at room temperature 76 pounds of ethylene glycol. The mill was started. Next there were added slowly to the glycol in the mill 4 pounds of powdered polyvinylpyrrolidone (PVP) having an average molecular weight of PVP of about 10,000 (commercially available as "PVP K–15," a product of GAF Corporation). Solution of the PVP into the glycol began immediately and was completed in about 5 minutes. Twenty pounds of furnace carbon black in the form of carbon beads (commercially available as "Conductex SC Carbon Beads," a product of Columbian Carbon Company) were then added to the mill and milling was continued for about 30 minutes, until dispersion of the carbon black particles into the PVP-ethylene glycol solution was substantially completed. The contents of the mill were next diluted by adding 100 pounds of ethylene glycol to the mill contents, forming a dispersion consisting, by weight, of 2% PVP, 10% carbon black and 88% ethylene glycol. The dilute dispersion was mixed until it was homogeneous. The fluid, dilute dispersion was transferred from the high shear mill to a Sharples continuous high-speed centrifuge and centrifuged to remove all oversize particles which had not been dispersed by the high shear mill. The amount of residue left in the centrifuge bowl was found to weigh about 2.2 pounds. The centrifuged, fluid, dilute dispersion was then transferred to an ester exchange reactor charge preparation area for use in preparation of an opaque prepolymer of poly(ethylene terephthalate). Total weight of the dispersion was about 197 pounds, of which about 175 pounds were ethylene glycol, and 17.8 pounds were carbon black, and the remainder PVP.

Example 2

Preparation of opaque poly(ethylene terephthalate).— The fluid, furnace black carbon-PVP-ethylene glycol dispersion from Example 1 was used to make an opaque prepolymer of poly(ethylene terephthalate) by mixing 76.6 pounds of the dispersion (equivalent to about 68 pounds of ethylene glycol) into 110 pounds of dimethyl terephthalate containing a conventional ester exchange catalyst and heated at increasingly raised reaction temperatures in the range from about 300° to 450° F. The reactants were heated and reacted in a usual way until the ester exchange reaction between the ethylene glycol and dimethyl terephthalate was substantially completed. The opaque monomeric-oligomeric product so formed was transferred to a polymerization reactor where the product was polymerized to poly(ethylene terephthalate) of an intermediate level of polymerization (prepolymer) in a known way. Inherent viscosity of the polyester so formed was 0.44. Melting point of this product was 257° C. The product was then blended with prepolymer products from four other similarly prepared batches. The blend was ground to a fine powder, fluidized, and further polymerized to form opaque poly(ethylene trephthalate) having an intrinsic viscosity of 0.63. The yield of product was 110 pounds. Polymerization in the melt phase by continuing the prepolymerization reaction is also intended to be within the scope of this invention.

Samples of the poly(ethylene terephthalate) product of 0.63 inherent viscosity were melt extruded through a 40 micron filter and found to pass through the filter without an undue pressure rise being obtained over the pressure normally obtained with clear poly(ethylene terephthalate) of similar inherent viscosity, similarly melt extruded. This result indicated that the particles of carbon in the polyester were well dispersed therein by the PVP and were not agglomerated.

Samples of the poly(ethylene terephthalate) were melted, extruded into sheet form, drafted, tentered and then heat set in known ways. The resulting biaxially-oriented poly(ethylene terephthalate) sheet appeared uniformly opaque both upon visual examination and under magnification, as evidenced by photomicrographs of the sheet. No pinholes or non-opaque areas were found in the sheet. Spectral optical density was found to be in excess of 8 over the wavelength range 350 to 750 nanometers. The sheet was found acceptable physically and chemically for use as an opaque support for photographic film of both the black and white and color multi-layered film varieties.

While the invention has been described with ethylene glycol as the liquid vehicle for the dispersion made according to the disclosed process, it is to be understood that other glycols may advantageously also be used for the purpose of the invention, i.e. the production of an opaque polyester sheet which in its opaque biaxially-oriented, heat set form is to serve as an opaque support in a multi-layered photographic film. The term "photographic film" as used throughout the description and claims is intended to include a multi-layered structure of which the product of the invention forms at least one layer.

Examples of other glycols which are used in the manufacture of polyesters and which may be used to practice the invention include the following: cyclo-aliphatic glycols, such as, 1,4 - cyclohexanedimethanol; aromatic glycols, such as, Bisphenol A; homologous series of aliphatic glycols from $C_2$ to $C_{10}$ and, preferably, 1,2-propylene glycol, 1,3-propanediol, 1,4-butanediol, and 1,5-pentanediol; and branched aliphatic glycols, such as, 2,2-dimethylpropanediol-1,3 and 2-ethyl-2-butyl-propanediol-1,3.

The above glycols can be condensed not only with dimethyl terephthalate to form highly polymeric linear polyesters suitable for practice of this invention but they can also be condensed with other organic bi-functional acids, esters or acid chlorides of the aromatic or aliphatic series to form suitable polyesters.

However, it is essential that the polyester forming reactants into which the dispersion of this invention is dispersed be chemically compatible with the polyvinylpyrrolidone component of the dispersion throughout the production of the opaque polyester, the biaxially-oriented sheet, film or foil made therefrom, and in subsequent use of the latter product in a photographic film.

Examples of polyesters which have been found to be compatible in their melted and film forms with polyvinylpyrrolidone may be found in U.S. Pat. 2,882,255, incorporated herein by reference, where also may be found examples of dicarboxylic compounds and dihydroxy compounds used in their preparation. It is expected that some or all of the polyesters described in U.S. 2,882,255 will be found compatible with polyvinylpyrrolidone for the manufacture of an opaque form of a polyester of the patent in practice of the present invention therewith.

Any carbon black material may be used successfully in the practice of this invention so long as its ultimate average particle size (diameter) is within the range of from about 5 to about 1,000 millimicrons, and preferably within the range of from about 8 to about 80 millimicrons. By "ultimate particle size" is meant the size of the individual carbon particles, and not the size of the carbon black "agglomerates" or "beads" (the form in which the carbon black is usually provided commercially). The "ultimate particle size" can be determined by suspending the carbon black sample in an organic solvent, passing the suspension through an efficient conventional pigment dispersion mill, and then quickly measuring the average particle size of the carbon black. Carbon black of the type known in the art as "furnace black" has been found most effective for practice of the invention, based on a series of tests carried out with at least 20 different carbon blacks obtained from various commercial sources of supply. Accordingly, furnace blacks having physical properties similar to those of Conductex SC are especially preferred for practice of the present invention.

The polyvinylpyrrolidone used in practice of the invention preferably is a homopolymer which is soluble in the ethylene glycol, or other glycols, used in practice of the invention. As used in practice of the present invention the polyvinylpyrrolidone should not react adversely with the reactants or catalysts in the ester exchange reactor or interfere with the rate of the reaction or cause side reactions which would interfere with the quality of the polyester product at either the monomeric, oligomeric, prepolymer, or final polyester stage, or during the melting, extrusion, calendering, drafting, tentering or heat setting of the biaxially-oriented sheet of the invention. Furthermore, the polyvinylpyrrolidone must not have any adverse effect on the photographic properties of the opaque polyester sheet made by practice of the invention when the sheet is used as a support layer in a multi-layered photographic film.

Polyvinylpyrrolidones having molecular weights in the range of from about 1,000 to 100,000 may advantageously be used in practice of the invention. A polyvinylpyrrolidone having a molecular weight in the range of from 10,000 to 30,000 is preferred for this purpose. The polyvinylpyrrolidone may be introduced into the ethylene glycol in powdered form or dissolved in a volatile solvent which will readily evaporate from the high shear mill, or in other liquid form. In most cases, a concentrated solution of the PVP polymer in ethylene glycol may be advantageously used.

The amount of polyvinyl pyrrolidone dispersing agent used in making the opacifier dispersion of the present invention will normally be only that amount needed to be added to the carbon black-glycol mixture to ensure adequate dispersion of the carbon black particles in the glycol under high shear milling conditions to form a stable, non-gelling fluid dispersion. Usually one part by weight of polyvinylpyrrolidone per about 3 to 6 parts of carbon black particles by weight will be adequate. More than the above ratio of polyvinylpyrrolidone dispersing agent to carbon black may be used, but such use is not necessary to achieve the advantages of the invention. In practicing the invention, the polyvinylpyrrolidone is preferably first dissolved in the entire amount of glycol to be used to make the dispersion in the high shear mill and the carbon black is then blended in.

The amount of carbon black particles dispersed into the glycol vehicle in the high shear mill preferably is that amount which can be dispersed homogeneously in the glycol by the polyvinyl pyrrolidone dispersing agent without causing dry agglomeration of the particles. The maximum amount can be determined experimentally for a particular glycol vehicle. In the case of ethylene glycol, the amount of carbon black particles will usually be one part by weight of carbon black per about 3 to 6 parts by weight of ethylene glycol.

When the milled carbon black dispersion is used as the opacifier dispersion in the ester exchange reactor, the dispersion will be used in an amount which will be adequate to cause opacification of the ester exchange product and the polyester thereafter made at each stage of the manufacture and in the ultimate product, i.e. the biaxially-oriented film used as a support in a multi-layered photographic film. Usually about 5 pounds of carbon black dispersed with 1 pound of polyvinylpyrrolidone dispersing agent will be charged to the ester exchange reactor with about 20 pounds of ethylene glycol for each 100 pounds of opaque prepolymer formed, in order that the ultimately prepared polyester film support will have a specular optical density over the wavelength range of 350 to 750 nanometers in excess of 8.

Multi-layered photographic film of the type in which the opaque biaxially-oriented polyester film made in accordance with the present invention serves as a support, or base, is well known in the photographic art. Such film is taught, for example, in U.S. Pat. 3,340,062, FIG. 9.

While the opaque polyester made according to the present invention is particularly advantageous in its use as a support in the manufacture of multi-layered photographic film, it is to be understood that the opaque polyester hereof also may be used in the manufacture of other opaque shaped bodies, such as filaments, fibers, foils, and ribbons and other shaped bodies in which the high optical spectral density of the polyester may be found to be advantageous.

The invention has been described in detail with particular references to the preferred embodiments thereof but it will be understood that variations and modifications can be effected within the spirit and scope of the invention as described hereinabove and as defined in the claims.

We claim:

1. In a process for making opaque, biaxially-oriented, heat-set polyester film suitable as a support material in a multi-layered photographic film, said process comprising the steps of: (1) making a dispersion of carbon black particles in a glycol vehicle in a high shear mill; (2) mixing said dispersion with polyester forming reactants and catalysts to form a mixture for forming a polyester monomer by an ester exchange reaction; (3) charging said mixture to an ester exchange reactor and heating and reacting said mixture to form said monomer; (4) condensing said monomer and polymerizing the condensed product to an opaque polyester having an inherent viscosity of about 0.63; (5) melting and extruding said polyester into an opaque sheet form; and (6) drawing, tentering, and heat setting said sheet into said opaque biaxially-oriented, heat-set film, the improvement which comprises carrying out said dispersion making step in the added presence of a carbon black dispersing amount of polyvinylpyrrolidone as a dispersing agent, said polyvinylpyrrolidone having a molecular weight in the range from about 1000 to 100,000 and being present in the ratio of at least one part by weight of polyvinylpyrrolidone per about 6 parts by weight of carbon black.

2. The process according to claim 1 wherein said dispersion in said mill comprises by weight from about 15 to 20 parts of carbon black, from about 4 to 5 parts of polyvinylpyrrolidone, and from about 76 to 80 parts of glycol.

3. The process according to claim 1 wherein the reactants for forming the polyester monomer comprise ethylene glycol and dimethyl terephthalate.

4. The process according to claim 2 wherein the glycol is ethylene glycol.

5. The process according to claim 4 comprising diluting the dispersion with ethylene glycol and passing the dilute dispersion through a centrifuge to remove oversized particles.

References Cited
UNITED STATES PATENTS

| | | | |
|---|---|---|---|
| 2,882,255 | 4/1959 | Caldwell et al. | 260—873 |
| 3,640,944 | 2/1972 | Seppala et al. | 260—40 R |
| 3,002,942 | 10/1961 | Zoetbrood | 260—22 A |
| 3,492,253 | 1/1970 | Katz et al. | 260—40 R |
| 3,340,062 | 9/1967 | Hunter, Jr., et al. | 96—84 M |
| 2,882,253 | 4/1959 | Lefferdink et al. | 264—78 |
| 3,377,412 | 4/1968 | Franks | 264—78 |

ROBERT F. WHITE, Primary Examiner
J. R. THURLOW, Assistant Examiner

U.S. Cl. X.R.

260—33.4, 40 R, 75 T; 264—210 R, 211, 289, 349